Sept. 23, 1952      A. RAPPL      2,611,148
WINDSHIELD CLEANER
Filed April 20, 1948
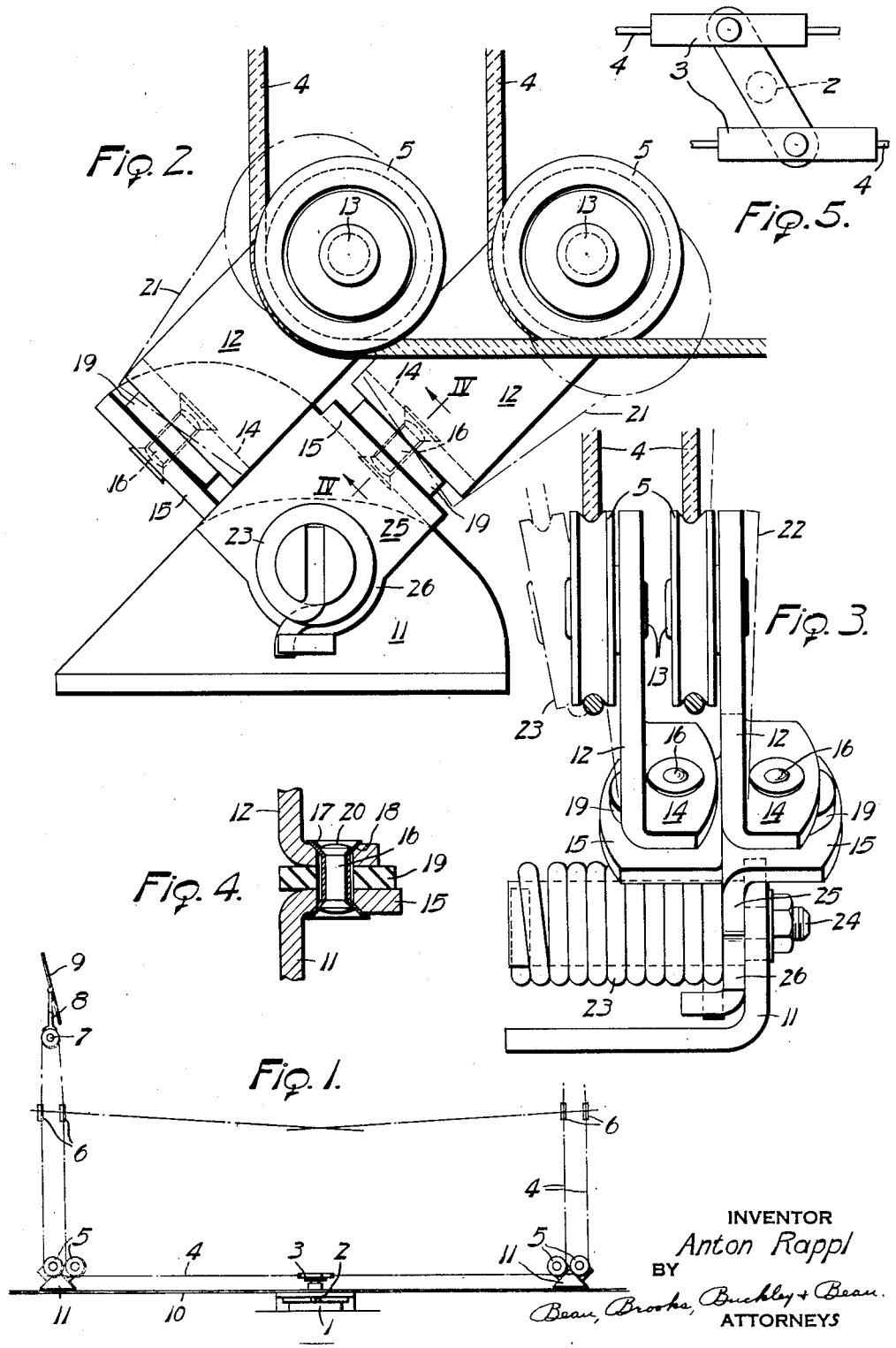

Patented Sept. 23, 1952

2,611,148

UNITED STATES PATENT OFFICE 2,611,148

WINDSHIELD CLEANER

Anton Rappl, Eggertsville, N. Y., assignor to Trico Products Corporation, Buffalo, N. Y.

Application April 20, 1948, Serial No. 22,142

6 Claims. (Cl. 15—253)

1

This invention relates to the windshield cleaning art and is particularly directed to the installation of the cleaner mechanism on motor vehicles.

It has heretofore been proposed to operate the cleaner blade or blades from a remote source of power through the instrumentality of a flexible transmission such as a cable. This cable has been supported intermediate its ends by guide pulleys which when out of alignment cause the cable to wear. Again, the cable may be subjected to abnormal strains under adverse weather conditions, with consequential impairment of windshield cleaning efficiency.

The primary object of the present invention is to provide an improved arrangement by which the efficiency of the windshield cleaner is improved and the installation of the cleaner mechanism facilitated.

Further, the invention has for its object to provide improved means for guiding and supporting the flexible transmission in a practical manner for relieving the driving cable from excessive and sudden strain incidental to hard usage during inclement weather.

These and other objects will manifest themselves as the description progresses, reference being had to the accompanying drawing wherein:

Fig. 1 is a diagrammatic view of a windshield cleaner mechanism embodying the present invention;

Fig. 2 is a side elevation of the improved transmission support;

Fig. 3 is an edge elevation of the support;

Fig. 4 is a detailed sectional view about on line 4—4 of Fig. 2; and

Fig. 5 is a fragmentary view of the power end of the transmission.

Referring more particularly to the drawing, the numeral 1 designates a motor having an oscillatory drive shaft 2 connected by links 3 to the power transmitting cables 4 which are supported and guided by pulleys 5 and 6 as they extend angularly to the wiper shafts 7 for oscillating the latter. Only one wiper shaft is herein depicted, the same carrying an arm 8 to which the wiping blade 9 is attached. The guide pulleys 5 are mounted on the dash 10 of the vehicle by suitable bracket means such as is shown at 11.

According to the present invention, the pulley wheels 5 are given a flexible support to render them self-aligning and self-adjusting for following the transmission cables should they shift laterally or become taut or loosen incidental to wiper operation. To this end the bracket or

2 mount 11 mounts the arms 12 on which the pulleys 5 are journaled, as by the shafts 13. Each arm has a base flange 14 seating upon an outstanding ledge 15 on the bracket and is connected thereto by a fastener or rivet 16 for pivotal movement. The fastener is spool-shaped with its flaring heads 17 freely engaging in like-shaped seats 18 in the remote ends of the fastener-receiving holes through the flange and the ledge. A soft rubber washer 19 is interposed between the flange and the ledge to hold the heads yieldably upon their seats. The fastener is loosely received in the registering holes so that the arm 12 may wobble freely on its supporting ledge under the resilient action of the rubber washer which serves as a spring to absorb all slack and to yieldably urge the arm to its upright position. The fastener may be conveniently made in the form of a tubular rivet with sustaining support afforded when necessary by means of a solid rivet or stay member 20 passing therethrough. This will facilitate the assembling of the parts for securing the desired freedom of movement for the pulley mounting since the tubular rivet enables the preliminary setting of the flaring heads and thereafter the more solid part 20 may be set to give reinforcement to the shell-like heads of the tubular rivet.

By reason of the foregoing construction and arrangement each pulley is given an independent flexible mounting which will enable the pulley seeking its best adjustment under the urge imposed by the tensioned cable. If the windshield wiper blade should be obstructed in its movement, as by snow packing in front of the wiping blade, one cable will tighten while the other loosens, with a consequential relative movement developing between the two pulleys, sometimes sideways and sometimes in the plane of operation. For example, the broken lines 21 in Fig. 2 suggest a possible angular displacement of the arm within the plane of operation, which might occur incidental to a whipping action, as when the cable slackens toward the end of one stroke and is subsequently snapped back at the beginning of the succeeding stroke. Or, the pulleys may float laterally, as indicated by the broken lines 22 in Fig. 3, to align or adjust themselves as the cable is pulled first in one direction and then in the other. The pulleys are free to either twist or bodily move on their brackets to more effectively and efficiently guide the flexible transmission. Having this freedom of self-aligning adjustment a predetermined cable tension may more readily be maintained and a better performance of windshield cleaning assured.

The bracket 11 is articulated in character and embodies a spring 23 which serves yieldably to impose a substantially uniform tension upon the power transmission cables. The spring may be a simple coil encircling the pivot or hinge pin 24 which latter joins the base section 25 of the bracket to the arm-mounting section 26, the latter having a lug upon which one end of the spring rests. This arrangement affords a swingable mount for the pulley which is responsive to an abnormal pull on the cable, while the pivot 16 provides an adjustment which will preclude misalignment of the pulley relative to its cable.

While the foregoing description has been given in detail for clarity, it is apparent that the inventive principles involved are capable of assuming other physical embodiments without departing from the spirit of the invention and the scope of the appended claims.

What is claimed is:

1. A windshield cleaner comprising a drive member, a shaft member, a wiper carried by the shaft, a transmission operatively connecting the two members and including a cable pulled back and forth by said drive to reciprocate the wiper, a guide pulley about which the cable passes, and means supporting the pulley for pivotal adjustment substantially about a radial axis with respect to the pulley for effecting self-alignment with the cable and additionally for swinging adjustment about a transverse axis with respect to the cable movement for responding to an abnormal strain imposed upon the cable by the wiper.

2. A windshield cleaner comprising a drive member, a shaft member, a wiper carried by the shaft, a transmission operatively connecting the two members and including a cable pulled back and forth by said drive to reciprocate the wiper, a guide pulley about which the cable passes, a journal support carrying the pulley, a pivotal mount swingingly carrying the support, and resilient means acting on the mount for yielding response to an abnormal pull imposed upon the cable by the wiper.

3. A windshield cleaner comprising a drive member, a shaft member, a wiper carried by the shaft, a transmission operatively connecting the two members and including a cable pulled back and forth by said drive to reciprocate the wiper, a guide pulley about which the cable passes, a resilient mount for the pulley having a swiveled part and acting to absorb a wiper imposed strain upon the cable, and a journal support carried by the swiveled part and supporting the pulley for universal movement.

4. A windshield cleaner comprising a drive member, a shaft member, a wiper carried by the shaft, a transmission operatively connecting the two members and including a cable pulled back and forth by said drive to reciprocate the wiper, a guide pulley about which the cable passes, a journal support carrying the pulley, a movable mount carrying the support and responding to an abnormal pull on the cable by the wiper, resilient means yieldably opposing such responsive movement, and means flexibly connecting the journal support to the movable mount.

5. A windshield cleaner comprising a drive member, a shaft member, a wiper carried by the shaft, a transmission operatively connecting the two members and including a cable pulled back and forth by said drive to reciprocate the wiper, a guide pulley about which the cable passes, a journal support carrying the pulley, a movable mount carrying the support and responding to an abnormal pull on the cable by the wiper, resilient means yieldably opposing such responsive movement, means flexibly connecting the journal support to the movable mount, and cushion means acting to urge the journal support to a normal position upon the movable mount.

6. A windshield cleaner comprising a drive member, a shaft member, a wiper carried by the shaft, a transmission operatively connecting the two members and including spaced cables pulled back and forth by said drive to oscillate the wiper, guide pulleys interposed between the drive and the shaft and about which the cables pass to guide angularly related cable portions, and means supporting the pulleys for independent pivotal adjustment substantially about a radial axis with respect to each pulley for effecting self-alignment with the cable and additionally for adjustment in and out between the angularly related cable portions and transversely with respect to the cable movement for responding to an abnormal strain imposed upon the cable by the wiper.

ANTON RAPPL.

REFERENCES CITED

The following references are of record in the file of this patent:

UNITED STATES PATENTS

| Number | Name | Date |
|---|---|---|
| 1,859,641 | Weaver | May 24, 1932 |
| 2,012,254 | Oishei | Aug. 20, 1935 |